United States Patent [19]

Brown

[11] 4,286,777

[45] Sep. 1, 1981

[54] MOUNT TO ABSORB SHOCKS

[75] Inventor: William J. Brown, Naperville, Ill.

[73] Assignee: Caterpillar Tractor Co., Peoria, Ill.

[21] Appl. No.: 95,193

[22] PCT Filed: Aug. 31, 1979

[86] PCT No.: PCT/US79/00681

§ 371 Date: Aug. 31, 1979

§ 102(e) Date: Aug. 31, 1979

[87] PCT Pub. No.: WO81/00606

PCT Pub. Date: Mar. 5, 1981

[51] Int. Cl.$^3$ ............................................. F16F 3/08
[52] U.S. Cl. .................................... 267/63 R; 248/635;
267/63 A; 267/141.1; 280/671; 296/35.1
[58] Field of Search ...................... 267/153, 140.3, 141,
267/141.1, 141.2, 141.3, 141.4, 141.5, 141.7, 63
R, 63 A; 248/557, 635; 280/671; 296/35.1, 102

[56] References Cited

U.S. PATENT DOCUMENTS

| | | | |
|---|---|---|---|
| 2,066,187 | 12/1936 | Piron | 267/63 A X |
| 2,144,170 | 1/1939 | Utz et al. | 296/35.1 |
| 2,273,869 | 2/1942 | Julien | 267/63 R X |
| 2,726,081 | 12/1955 | Hunter | 267/141 X |
| 2,838,339 | 6/1958 | Schaldenbrand | 267/21 R X |
| 2,926,881 | 3/1960 | Pointer | 267/141.4 |
| 3,250,565 | 5/1966 | Jaskowiak | 296/35.1 |
| 3,781,058 | 12/1973 | Ziolko et al. | 296/35.1 |
| 3,990,737 | 11/1976 | Palmer | 296/35.1 |
| 4,006,892 | 2/1977 | Koeneman | 267/141 X |

FOREIGN PATENT DOCUMENTS

| | | | |
|---|---|---|---|
| 608671 | 9/1960 | Italy | 267/141.4 |
| 521274 | 5/1940 | United Kingdom | 267/63 R |
| 1386433 | 3/1975 | United Kingdom | 267/63 R |

Primary Examiner—George E. A. Halvosa
Attorney, Agent, or Firm—Wegner, Stellman, McCord, Wiles & Wood

[57] ABSTRACT

This invention relates to a shock-absorbing apparatus (12) for mounting a platform (13) or the like on a frame (14). Each apparatus (12) includes a fastening member (26) extending from the platform (13) through an aperture (22) in the frame (14) and carries a support (30) on the opposite side of the frame (14) from the platform (13). A spacer (24) extends from the platform (13) to the support (30) with a resilient bushing (16) encircling the fastening member (26) between the platform (13) and the frame (14). A second resilient bushing (18) encircles the fastening member (26) between the frame (14) and the support (30). Each resilient bushing (16,18) includes at least one ring (32,36) of each bushing (16,18) having a portion compressed between the washer (30) and the platform (13) with at least one second ring (34,38) of each bushing (16,18) being initially spaced from the platform (13) or from the support (30). The second rings (34,38) of each bushing (16,18) being of a material that is harder and less resilient than the material of the first rings (32,36).

4 Claims, 4 Drawing Figures

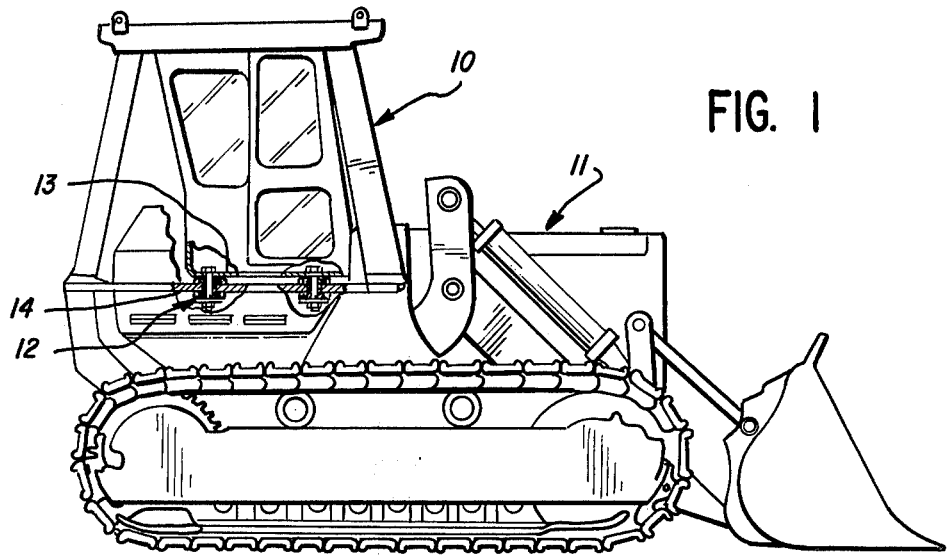
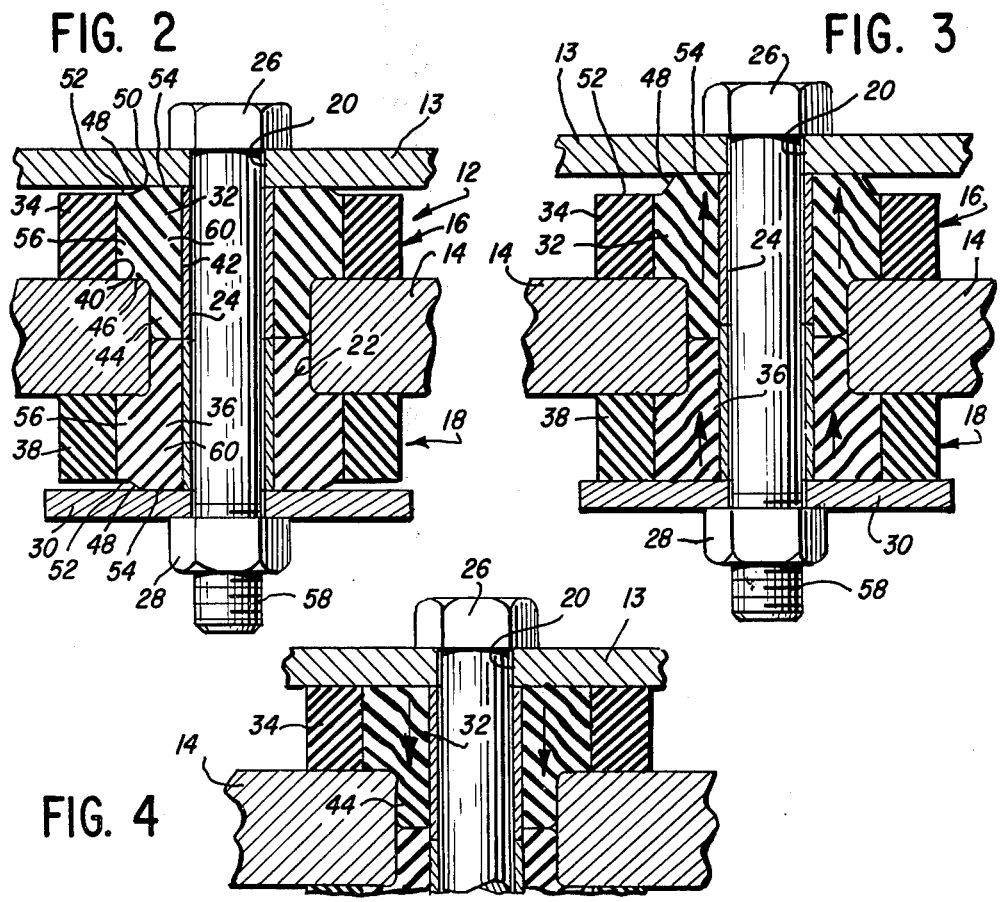

MOUNT TO ABSORB SHOCKS

TECHNICAL FIELD

This invention relates to a mount for securing together parts having limited relative movement therebetween and, more particularly, to a shock absorbing fastening device for mounting a platform, or the like, on a frame.

BACKGROUND ART

Land vehicles and earthworking vehicles, in particular, are, during operation, subject to extreme vibrational forces which are a source of considerable discomfort to the operator. Also, operator protection standards are provided by law which limit the noise level to which operators can be exposed. Because sound and other vibrations are readily transmitted through metal-to-metal contact, the utility of a resilient mounting system for securing the cab to the vehicle becomes apparent. The use of a cushioned mounting system for land vehicles has been explored in prior patents, those among the most pertinent being Utz et al U.S. Pat. No. 2,144,170, issued Jan. 17, 1939; Schaldenbrand U.S. Pat. No. 2,838,339, issued June 10, 1958; and Palmer U.S. Pat No. 3,990,737, issued Nov. 9, 1976.

Both the Utz et al and Schaldenbrand patents contemplate the use of a pair of apertured resilient insulators or mounts encasing a bolt which secures a body to a frame, the insulators being compressed when the mount is fully assembled. The Utz et al patent further envisions the degree of hardness of the resilient members being varied to provide the required relative movement between the body and the chassis. The Palmer patent, which has the same assignee as the present invention, discloses a mounting system wherein a rubber-like base pad is placed between the vehicle and the cab and the bolts securing the cab to the vehicle are encased with a resilient bushing. Palmer allows strong metal-to-metal contact to occur in the event of a large force, such as the vehicle overturning.

DISCLOSURE OF INVENTION

The present invention is directed to overcoming one or more of the problems as set forth above.

In one aspect of the present invention, a shock absorbing fastening device for mounting protective cabs, and the like, onto a vehicle consists of a series of concentric resilient members of differing hardness combined to form a pair of shock absorbing bushings positioned at appropriate locations between the cab and the vehicle frame. The cab is secured to the vehicle frame by a fastener surrounded by a spacer, the body of the spacer being encased by the bushings. At least one resilient member of an axially aligned pair of resilient members is shaped so that one portion of said one resilient member is initially deformed to dampen small shocks or vibrations while the remaining portion of said one resilient member and at least one member of a second pair of resilient members will be contacted and be deformed when the force of the shocks and vibrations exceeds the limits of the first-named portion of the one resilient member of the first-named pair of resilient members. The bushings can be configured to subject at least one resilient member to a shearing force.

The present invention goes further than the previously mentioned Utz et al and Schaldenbrand teachings and contemplates combining concentric resilient members of different hardness to form each shock absorbing mount. The harder member provides a strong tightening stop for large shocks but avoids the metal-to-metal contact envisioned in the aforementioned Palmer patent. The present invention also contemplates a configuration where selected resilient members are subjected to a shearing force while previous patents envisioned resilient members subjected only to compression.

Like the prior art, the present mounting device is simple in construction and reliable in operation, however, it is not as subject to early fatigue failure as are resilient mounts of earlier design. The present invention contemplates the resilient members being sized so the force required to deform the softer member to the point where the harder member is engaged is nearer to the softer member's endurance limit, i.e. the stress below which fatigue does not occur within a reasonable number of stress cycles. Thus, the softer member only absorbs shocks within its endurance limit. The harder member dampens larger shocks and provides a secure mount while avoiding the vibration transmitting characteristics of mounts having metal-to-metal contact.

BRIEF DESCRIPTION OF DRAWINGS

FIG. 1 is a side elevational view of a vehicle employing an embodiment of the present invention with parts of the vehicle broken away to illustrate the internal structure of the invention;

FIG. 2 is an enlarged sectional view of an embodiment of the present invention in its static state;

FIG. 3 is an enlarged sectional view of an embodiment of the present invention where the vehicle frame is subjected to a downward force; and FIG. 4 is an enlarged sectional view of an embodiment of the present invention where the vehicle frame is subjected to an upward force.

BEST MODE FOR CARRYING OUT THE INVENTION

In one aspect of the present invention, a cab 10 is mounted on an earthworking vehicle 11 by means of a plurality of shock absorbing mounting devices 12, the number of mounting devices depending upon the size of the cab and other design considerations. The illustrated form of cab 10 is an integrally constructed unit having a floor, deck or mounting platform 13 through which the cab is secured to the vehicle frame 14.

Referring to FIG. 2, each mounting device 12 comprises a pair of resilient bushings 16 and 18, with bushing 16 being positioned between the platform 13 of the cab 10 and the frame 14, and with bushing 18 being positioned on the opposite side of the frame 14 from the cab 10. The platform 13 and frame 14 have aligned apertures 20, 22, respectively, with a spacer 24 extending through the bushings 16 and 18 and abutting at one end against the platform 13 around the aperture 20. A bolt 26 passes through the aperture 20 in said platform 13, passes through the spacer 24 and has a nut 28 threaded on the extended end thereof to secure a washer 30 against the other end of said spacer 24.

The bushing 16 includes a pair of resilient concentric shock absorbing rings 32 and 34 and bushing 18 includes a pair of resilient concentric shock absorbing rings 36 and 38. The rings 32 and 36 and rings 34 and 38 have substantially identical constructions and are made of the same materials and, therefore, the description will proceed with respect to rings 32 and 36 only. The ring 34 has an aperture 40 in which the ring 32 is nested. Ring 32 has an aperture 42 through which the metallic elongate cylindrical spacer 24 extends. Although rings 32,34 and 36,38 are shown as circular, it is to be understood that the rings could have a square, a rectangular, or other cross-sectional shape in a plane transverse to the axis of the apertures 40 and 42 in said rings. Ring 32 has a cylindrically-shaped lip 44 extending axially from a radially extending, axially facing surface 46 on the ring, with said lip 44 extending part way into the aperture 22 in the frame 14. The ring 32 has a sloping shoulder 48 on the other radially extending, axially facing surface 50 of said ring, which shoulder 48 divides said surface 50 into two radially extending, axially spaced apart planar surfaces 52 and 54.

Ring 34 is a cylindrically-shaped member and has a dimension in the axial direction which is substantially equal to the axial dimension of one portion 56 of ring 32, which portion 56 lies between the surface 52 and the surface 46. The composition of the material of ring 32 is softer or of a lower durometer rating than the composition of the material of ring 34 and since ring 32 bears against the outer surface of the spacer 24 and is trapped in the aperture 40 of the ring 34, it has virtually no area to expand radially under compressive loads.

Each mounting device 12 is assembled between the platform 13 of the cab 10 and the frame 14 by placing a resilient bushing 16 between the platform 13 and the frame 14 with the lip 44 of ring 32 extending into the aperture 22 in the frame 14. The platform 13 will bear against and will be supported on the surface 54 of the ring 32. Resilient bushing 18 is assembled against the lower portion of the frame 14 with the lip 44 of the ring 36 nesting in the aperture 22 in the frame 14. The spacer 24 is inserted through the apertures 42,42 in the rings 32 and 36 with the upper end of the spacer 24 and bushing 16 bearing against the undersurface of the platform 13. The bolt 26 is passed through the aperture 20 in the platform 13 and through the center of the spacer 24. The washer 30 is assembled on the end of the bolt 26 with a nut 28 threaded on a threaded portion 58 of the bolt. As the nut 28 is tightened, the washer 30 bears against the surface 54 of the ring 36 and will compress the portions 60 of the rings 36 and 32 between the surfaces 54 and 46, as well as between the surfaces 54 and the abutting faces of the lips 44. Ultimately, the washer 30 will abut against the end of the spacer 24 so that the spacer is compressed between the platform 13 and the washer 30, and the portion 60 of the rings 32,36 are compressed to a preloaded condition. Since only portions 60 of the rings 32 and 36 are compressed, the rings 32 and 36 are placed in shear generally along a line extending between the shoulders 48 on the rings 32 and 36. The preloading of the portions 60 of the rings 32,36 provides for a firm cushioned support for the cab 10 on the frame 14. As shown in FIG. 2, the radially extending, axially facing surfaces lie in planes substantially parallel to each other and substantially parallel to the platform (13) and support means (30). The radially extending, axially facing surfaces (52) of rings (34,56; 36,38) are coplanar.

INDUSTRIAL APPLICABILITY

Referring to FIG. 3, when the frame 14 of the vehicle 11 is subject to a downward dynamic force, as when the vehicle travels over a bump, the frame 14 further compresses the portion 60 of the preloaded ring 36 until the previously unloaded portion 56 between surface 52 and surface 46 contacts the washer 30. Substantially simultaneously with the washer 30 contacting surface 52 of ring 36, it will also contact and apply compressive forces to the harder material of the ring 38. In this way, one portion 60 of the ring 36 is under severe compressive forces while another portion 56 of said ring 36 is under less severe compressive forces with a shear line therebetween. The principal compressive force is dissipated through the harder material of the ring 38. At the same time, resilient bushing 16 is unloading or being subjected to less compressive forces in the portion 60 of the ring 32, since the distance between the frame 14 and the platform 13 is enlarging. The force from the frame 14 is transmitted through the resilient bushing 18, washer 30, nut 28, bolt 26 and spacer 24 to the platform 13 of the cab 10. The jolt of the bump having been substantially dissipated with the ring 38 abutting the frame 14 and washer 30 and, since ring 38 is relatively incompressible, the movement of the cab 10 away from the frame 14 will be halted.

A somewhat similar, but opposite reaction, will occur when the vehicle 11 is subject to an upward force. This is partially illustrated in FIG. 4 where the frame 14 is moving upward toward the platform 13 of the cab 10 which will further compress the portion 60 of the ring 32 until the other portion 56 of the ring 32 and the ring 34 are contacted between the platform 13 and the frame 14. Ring 32 has a shear line between the portions 56 and 60 and, since the ring 34 is of hard, relatively incompressible material, the shock load is dissipated as it is transmitted between the platform 13 and the frame 14. At the same time, the ring 36 is relaxing into a substantially unloaded state.

While the invention is illustrated as dampening vertical shocks, the resilient bushings will also dampen horizontal vibrations. Thus, the bushings provide a complete dampening barrier between the cab 10 and the vehicle frame 14.

Other aspects, objects and advantages of this invention can be obtained from a study of the drawings, the disclosure and the appended claims.

I claim:

1. A shock-absorbing apparatus between a platform (13) and a frame (14), said platform (13) having a fastening means (26) extending through an aperture (22) in said frame (14), support means (30) carried by said fastening means (26) on the opposite side of said frame (14) from said platform (13), the improvement comprising:
    a spacer (24) extending between said platform (13) and said support means (30);
    a pair of resilient bushings (16,18) encircling said fastening means (26) with one of said resilient bushings (16) being positioned between said frame (14) and said platform (13) and the other of said resilient bushings (18) being positioned between said frame (14) and said support means (30);
    each resilient bushing (16,18) having an radially extending, axially facing surface (54) extending axially beyond a second radially extending, axially facing surface (52) of said resilient bushing, said radially extending, axially facing surfaces (52,54) of each bushing lying in planes substantially parallel to each other and substantially parallel to said platform (13) and said support means (30);
    means (28) on said fastening means (26) for urging said support means (30) toward said platform (13) to engage said spacer (24) between said platform (13) and said support means (30) and to compress a portion (60) of said resilient bushings (16,18) aligned with said first-named radially extending, axially facing surfaces (54) between said platform (13) and said support means (30), said second-named radially extending, axially facing surfaces (52) being spaced from said platform (13) and from said support means (30);

at least one of said resilient bushings (16,18) includes a pair of concentric rings (32,34; 36,38), one ring (32,36) of said pair of rings having said two radially extending, axially facing surfaces (52,54) with said first-named radially extending, axially facing surface (54) being axially spaced from the second radially extending, axially facing surface (52) of said one ring (32,36), the compressed portions (60) of said bushings (16,18) being that portion of said one ring axially aligned with said first-named surface (54) and another ring (34,38) of said pair of rings having radially extending, axially facing surfaces (52) coplanar with the second radially extending, axially facing surfaces (52) of said one ring (32,36);

initial compression of said bushing compresses the portion of said one ring (32,36) aligned with said first-named surface (54) creating a shear line with the uncompressed portion of said one ring;

further compression of said bushing contacts said second radially extending, axially facing surfaces (52) of the one ring and of the another ring with the aligned platform and support means to compress both the remaining previously uncompressed portion of said one ring and said another ring; and said another ring (34,38) being of a harder resilient material than said one ring (32,34) and being concentrically disposed about the periphery of said one ring, said harder concentrically disposed another ring restricts expansion of said one ring increasing the resistance to compression of said one ring thereby increasing the shock absorbing properties of the apparatus.

2. A shock-absorbing apparatus as claimed in claim 1 wherein said spacer (24) is a cylindrical member encircling said fastening means (26).

3. A shock-absorbing apparatus as claimed in claim 1 wherein said compressed portion (60) of said one ring (32,36) is adjacent the fastening means (26).

4. A shock-absorbing apparatus as claimed in claim 1 wherein said platform (13) has an aperture (20) therethrough in alignment with said aperture (22) in said frame (14), and wherein said fastening means (26) is a bolt (26) extending through said aperture (20).

* * * * *